(12) United States Patent
Littlefield et al.

(10) Patent No.: US 10,124,661 B1
(45) Date of Patent: Nov. 13, 2018

(54) POWER-SPLIT HYBRID POWERTRAIN

(71) Applicant: GM GLOBAL TECHNOLOGY OPERATIONS LLC, Detroit, MI (US)

(72) Inventors: Joseph R. Littlefield, Sterling Heights, MI (US); Alan G. Holmes, Clarkston, MI (US); Rebecca K. Risko Cattell, Ferndale, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 5 days.

(21) Appl. No.: 15/495,438

(22) Filed: Apr. 24, 2017

(51) Int. Cl.
*B60K 6/365* (2007.10)
*F16H 3/72* (2006.01)
*B60K 6/48* (2007.10)

(52) U.S. Cl.
CPC ............ *B60K 6/365* (2013.01); *B60K 6/48* (2013.01); *F16H 3/724* (2013.01); *B60K 2006/4816* (2013.01); *B60Y 2200/92* (2013.01); *Y10S 903/91* (2013.01)

(58) Field of Classification Search
CPC .. B60K 6/365; B60K 6/48; B60K 2006/4816; F16H 3/72; F16H 3/724; F16H 3/725
See application file for complete search history.

(56) References Cited

U.S. PATENT DOCUMENTS

| | | | | |
|---|---|---|---|---|
| 5,934,396 A | * | 8/1999 | Kurita | B60K 6/365 180/65.25 |
| 7,507,174 B2 | * | 3/2009 | Raghavan | B60K 6/40 475/5 |
| 7,699,735 B2 | * | 4/2010 | Conlon | B60K 6/365 475/5 |
| 7,967,711 B2 | * | 6/2011 | Conlon | B60W 10/10 475/280 |

* cited by examiner

*Primary Examiner* — Erin D Bishop
(74) *Attorney, Agent, or Firm* — Quinn IP Law

(57) ABSTRACT

A power-split hybrid powertrain for a vehicle includes a first power-source configured to generate a first output torque, a second power-source configured to generate a second output torque, and a transmission assembly having a transmission input member. The powertrain also includes a planetary gear-set having first, second, and third nodes, wherein each of the three nodes is operatively connected to a separate one of the first power-source, second power-source, and transmission input member. The powertrain additionally includes a housing configured to retain the planetary gear-set. Also, the powertrain includes a first torque-transmitting device configured to selectively connect to the housing the node that is operatively connected to the first power-source. Furthermore, the powertrain includes a second torque-transmitting device configured to selectively connect the node that is operatively connected to the first power-source to the node that is operatively connected to the second power-source.

20 Claims, 4 Drawing Sheets

POWER-SPLIT HYBRID POWERTRAIN

INTRODUCTION

The disclosure relates to a power-split hybrid electro-mechanical powertrain for a motor vehicle.

Modern motor vehicles are typically configured as either two- or all-wheel-drive. Either type of a vehicle may employ a powertrain where a single engine is used to propel the vehicle, or a hybrid powertrain using two or more distinct power-sources, such as an internal combustion engine and an electric motor, to accomplish the same task. An all-wheel-drive hybrid vehicle may be configured as an axle-split vehicle.

In such an all-wheel-drive hybrid vehicle, one or more power-sources, such as an internal combustion engine alone or with an electric motor, on one axle, and another power-source on another axle, may be set up to independently power the respective vehicle axles to generate on-demand all-wheel-drive propulsion. In such a vehicle, an engine and an electric motor connected to the same axle may be configured to channel their respective torque outputs through a transmission assembly to effectively provide a power-split electro-mechanical hybrid powertrain.

SUMMARY

A power-split hybrid powertrain for a motor vehicle includes a first power-source configured to generate a first torque output, a second power-source configured to generate a second torque output, and a transmission assembly having a transmission input member. The powertrain also includes a planetary gear-set having first, second, and third nodes, wherein each one of the first, second, and third nodes is operatively connected to a separate one of the first power-source, the second power-source, and the transmission input member. The powertrain additionally includes a housing configured to retain the planetary gear-set. Also, the powertrain includes a first torque-transmitting device configured to selectively connect to the housing the planetary gear-set node that is operatively connected to the first power-source. Furthermore, the powertrain includes a second torque-transmitting device configured to selectively connect the planetary gear-set node that is operatively connected to the first power-source to the planetary gear-set node that is operatively connected to the second power-source.

In one embodiment, the first power-source may be operatively connected to the first node. The second power-source may be operatively connected to the third node. The transmission input member may be operatively connected to the second node. In such an embodiment, the first torque-transmitting device may be configured to selectively connect the first node to the housing, and the second torque-transmitting device may be configured to selectively connect the first node to the third node.

In another embodiment, the first power-source may be operatively connected to the second node. The second power-source is operatively connected to the third node. The transmission input member may be operatively connected to the first node. In such an embodiment, the first torque-transmitting device is configured to selectively connect the second node to the housing, and the second torque-transmitting device may be configured to selectively connect the second node to the third node.

In yet another embodiment, the first power-source may be operatively connected to the third node. The second power-source may be operatively connected to the first node. The transmission input member is operatively connected to the second node. In such an embodiment, the first torque-transmitting device is configured to selectively connect the third node to the housing, and the second torque-transmitting device is configured to selectively connect the first node to the third node.

In an engaged state, the first torque-transmitting device may be configured to transmit the second torque output to the transmission assembly.

In an engaged state, the second torque-transmitting device may be configured to transmit the first torque output and the second torque output to the transmission assembly.

The first node may be a ring gear member of the planetary gear-set, the second node may be a carrier member of the planetary gear-set, and the third node may be a sun gear member of the planetary gear-set.

The first power-source may be an internal combustion engine, while the second power-source may be a motor-generator.

The transmission assembly may be configured as a multi-speed automatic gearbox.

Alternatively, the transmission assembly may be configured as a continuously variable transmission (CVT).

A hybrid-electric vehicle drive axle employing such a power-split hybrid powertrain is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
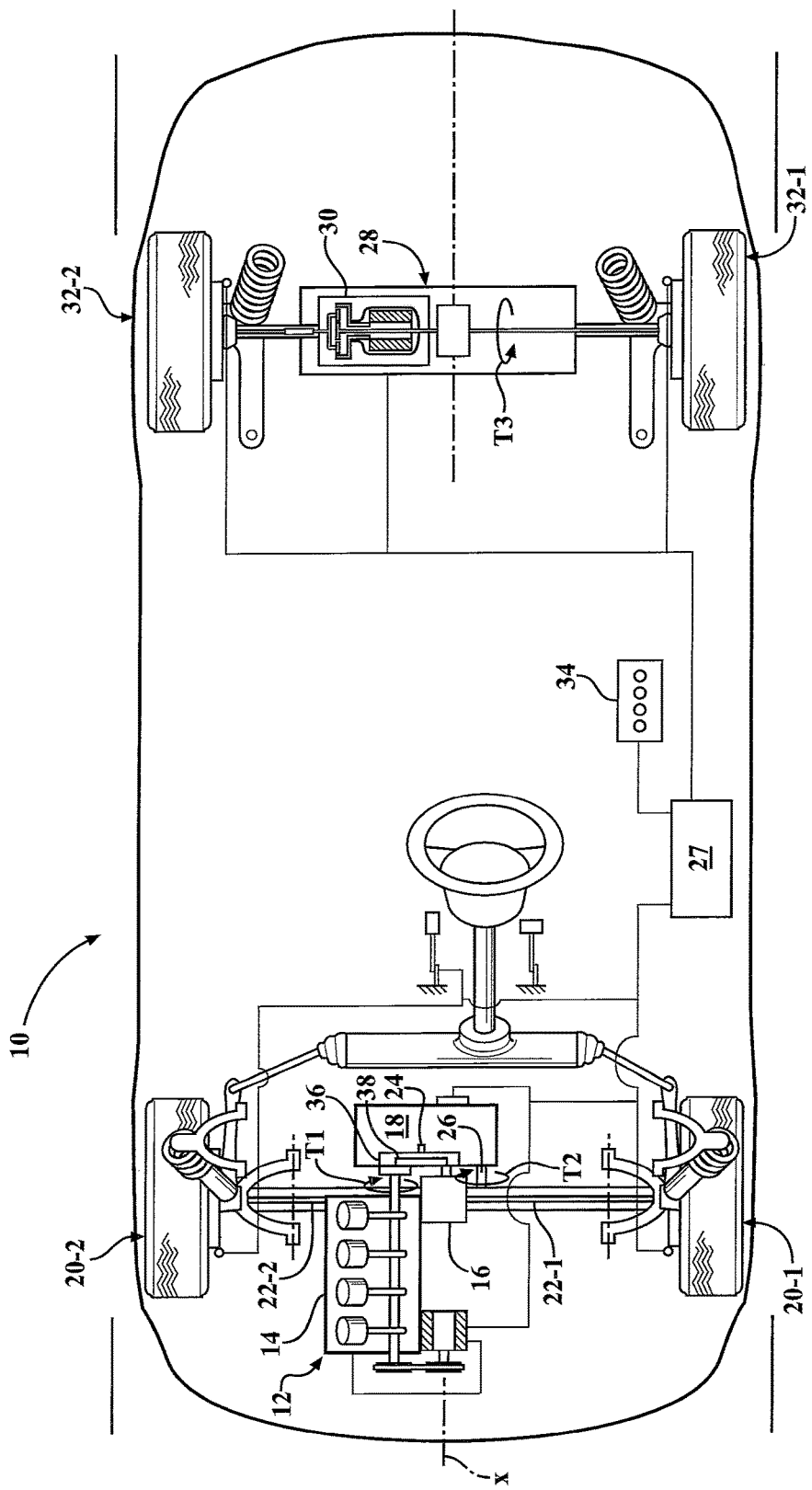
FIG. 1 is a schematic illustration of a vehicle employing a hybrid electric powertrain that includes a first drive axle including an internal combustion engine, an electric motor-generator, a transmission, and a torque-multiplication assembly, according to the disclosure.

Referring to the drawings in which like elements are identified with identical numerals throughout, FIG. 1 illustrates a vehicle 10 having independent first and second power-sources that are operatively connected to respective sets of driven wheels in order to provide on-demand all-wheel-drive propulsion. The vehicle 10 may include, without being limited to, a commercial vehicle, industrial vehicle, passenger vehicle, aircraft, watercraft, train or the like. As shown, the vehicle 10 is generally arranged along a longitudinal vehicle axis X.

The vehicle 10 includes a first hybrid-electric drive axle 12. The first drive axle 12 includes a power-split hybrid powertrain 13 having a first power-source 14, shown as an internal combustion engine, and a second power-source 16, shown as a first electric motor-generator. The drive axle 12 also includes a transmission assembly 18, along with a first set of wheels, including a first or left-side road wheel 20-1 operatively connected to the transmission assembly via a first axle-shaft 22-1 and a second or right-side road wheel 20-2 operatively connected to the transmission assembly via a second axle-shaft 22-2. The first power-source 14 and the second power-source 16 are configured to drive the vehicle 10 through the transmission assembly 18, either together or separately, via the first and a second wheels 20-1, 20-2.

Specifically, the first power-source 14 is configured to generate a first torque output T1, while the second power-source 16 is configured to generate a second torque output T2, each for driving the vehicle 10 through the transmission assembly 18. The transmission assembly 18 generally includes a transmission input member 24 configured to receive torque of the first and second power-sources 14, 16, and a transmission output member 26 configured to transmit torque from the transmission assembly 18 to the first and second axle-shafts 22-1, 22-2. The transmission assembly 18 may be configured as a multi-speed automatically shiftable gearbox with discrete speed ranges provided by specific gear-sets and clutches, or a continuously variable transmission (CVT), as understood by those skilled in the art. As shown, the first hybrid-electric drive axle 12, including the power-split hybrid powertrain 13, is generally controlled by a controller 27.

As shown in FIG. 1, the vehicle 10 additionally includes a second drive axle 28. The second drive axle 28 is operatively independent from the first hybrid-electric drive axle 12. The second drive axle 28 includes an independent third power-source 30, shown as a first electric motor-generator that is configured to generate a third torque output T3 for driving the vehicle 10 via a second set of wheels, which includes a first or left-side road wheel 32-1 and a second or right-side road wheel 32-2. Each of the second and third power-sources 16, 30 configured as respective electric motor-generators receives its electrical energy from an energy storage device 34. Similar to the first hybrid-electric drive axle 12, the second drive axle 28 is generally controlled by the controller 27. Accordingly, the vehicle 10 may be powered by the respective first and second vehicle drive axles 12 and 28 independently or in combination to generate on-demand front, rear, or all-wheel-drive propulsion.

The power-split hybrid powertrain 13 additionally includes a torque-multiplication assembly 36 arranged between the group of the first and second power-sources 14, 16 and the transmission 18. The torque-multiplication assembly 36 includes a planetary gear-set 38. The planetary gear-set 38 includes a first node A, a second node B, and a third node C. The assembly 36 is configured such that each one of the first, second, and third nodes A, B, C is operatively connected to a separate one of the first power-source 14, the second power-source 16, and the transmission input member 24. The assembly 36 also includes a first torque-transmitting device 40 and a second torque-transmitting device 42. The planetary gear-set 38, the first torque-transmitting device 40, and the second torque-transmitting device 42 are encased and retained inside a housing 44 that may be mounted to each of and in between the first and second power-sources 14, 16 and the transmission 18.

Figure 2:
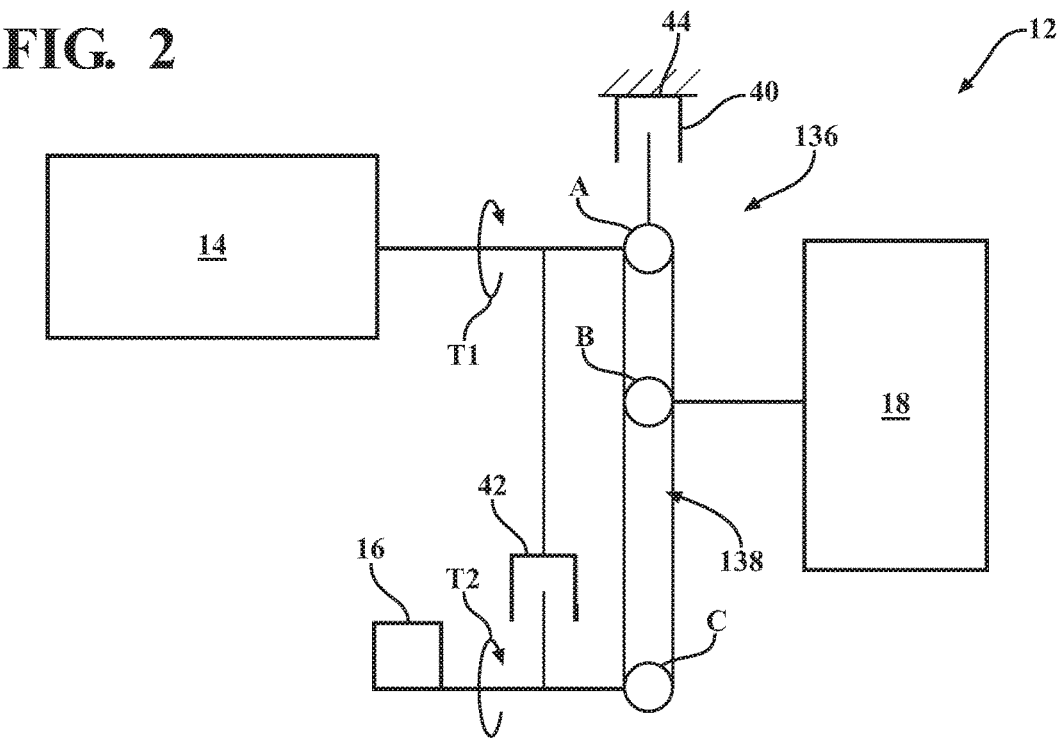
FIG. 2 is a schematic lever diagram illustration of one embodiment of the first drive axle shown in FIG. 1.
Figure 4:
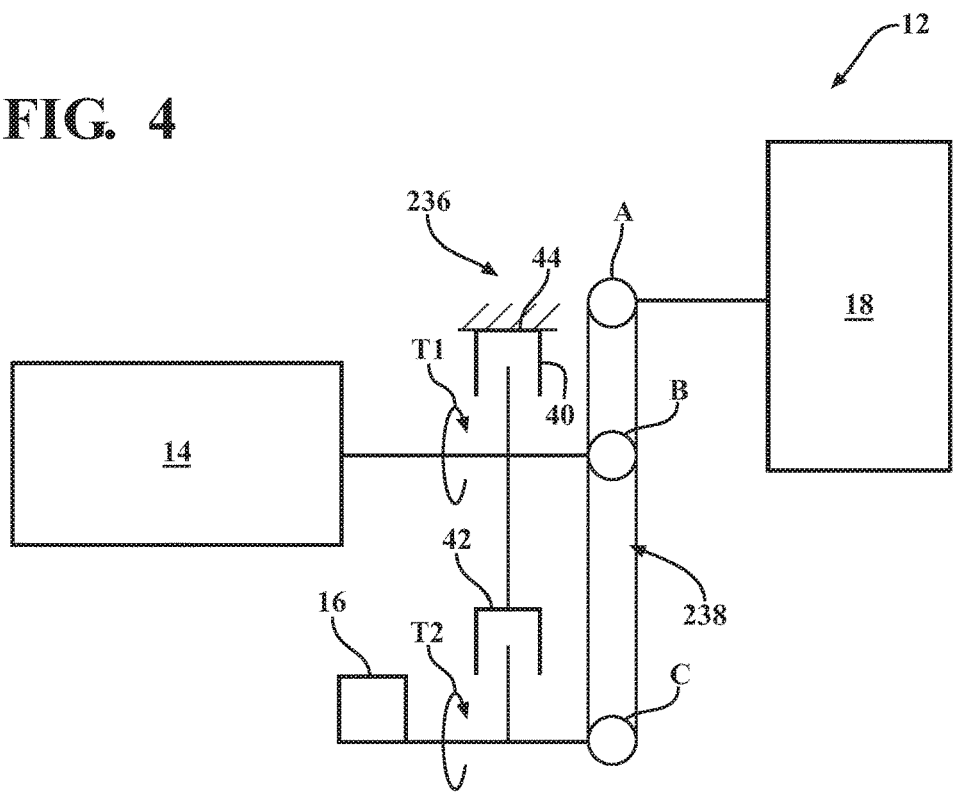
FIG. 4 is a schematic lever diagram illustration of another embodiment of the first drive axle shown in FIG. 1.
Figure 6:
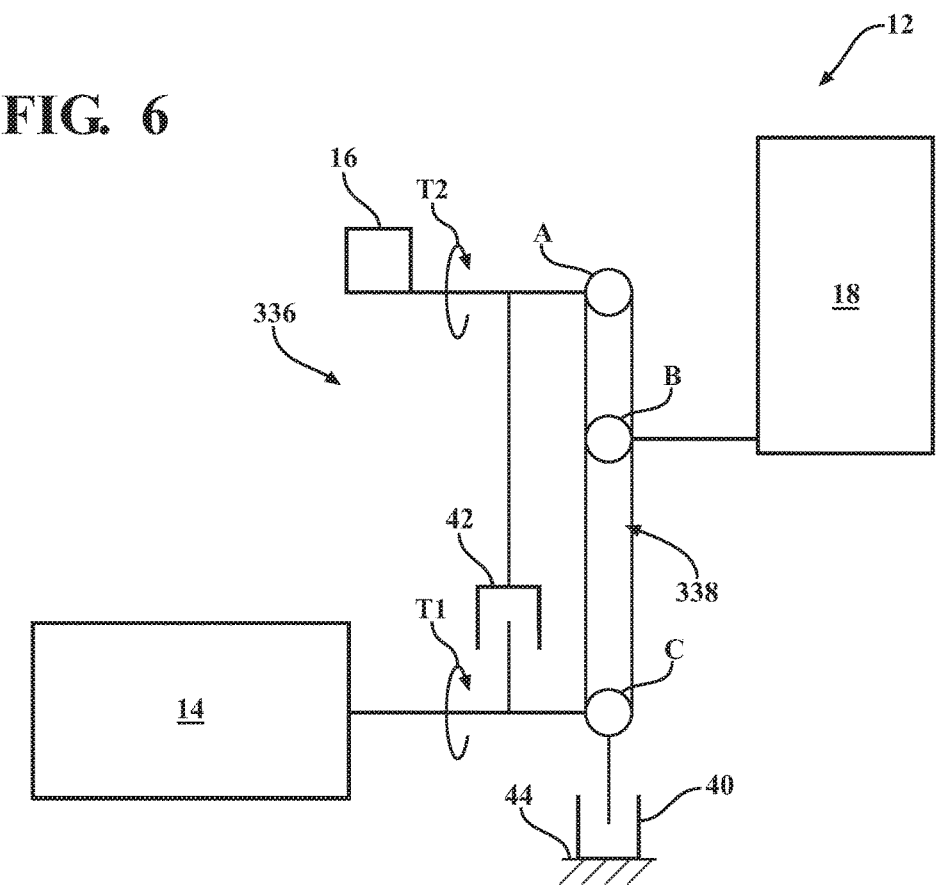
FIG. 6 is a schematic lever diagram illustration of yet another embodiment of the first drive axle shown in FIG. 1.

Specific embodiments of the first drive axle 12 using the assembly 36 are represented in lever diagram form in FIGS. 2, 4, and 6. A lever diagram is a schematic representation of the components of a mechanical device such as an automatic transmission. Each individual lever represents a planetary gear-set or an external gear-set. In the planetary gear-set levers, the three basic mechanical components of the planetary gear are each represented by a node. Therefore, a single planetary gear-set lever contains three nodes: one for the sun gear member, one for the planet gear carrier member, and one for the ring gear member. The relative length between the nodes of each planetary gear-set lever may be used to represent the ring-to-sun ratio of each respective gear-set. These lever ratios, in turn, are used to vary the gear ratios of the transmission in order to achieve appropriate ratios and ratio progression. Mechanical couplings or interconnections between the nodes of the various planetary gear-sets are illustrated by thin, horizontal lines and torque transmitting devices such as clutches and brakes are presented as interleaved fingers. If the device is a brake, one set of the fingers is grounded. Further explanation of the format, purpose and use of lever diagrams may be found in SAE Paper 810102, authored by Benford, Howard and Leising, Maurice, "The Lever Analogy: A New Tool in Transmission Analysis", 1981, which is hereby fully incorporated by reference.

The nodes A, B, and C represent first, second and third members of the planetary gear-set 38, such as a ring gear member, a carrier member and a sun gear member, although not necessarily in that order. In each of the embodiments illustrated in FIGS. 2-4, the first torque-transmitting device 40 is configured to selectively connect or ground to the housing 44 one of the first, second, and third nodes A, B, C that is operatively connected to the first power-source 14. The second torque-transmitting device 42, on the other hand, is configured to selectively connect the node of the planetary gear-set 38 that is operatively connected to the first power-source 14 to the node of the planetary gear-set 38 that is operatively connected to the second power-source 16.

FIG. 2 shows a specific embodiment of the first drive axle 12 using the torque-multiplication assembly 36, herein identified with a numeral 136. The assembly 136 has a specific embodiment of the planetary gear-set 38, identified with a numeral 138. The assembly 136 is configured such that the first power-source 14 is operatively connected to the first node A, which may be specifically defined as a ring gear member 146. The transmission input member 24 is operatively connected to the second node B, which may be specifically defined as a carrier member 148 rotatably supporting a plurality of pinion gears 150 (shown in FIG. 3). Also, the second power-source 16 may be operatively connected to the third node C, which may be specifically defined as a sun gear member 152. Furthermore, the first torque-transmitting device 40 is configured to selectively connect the first node A to the housing 44 and the second torque-transmitting device 42 is configured to selectively connect the first node A to the third node C.

Figure 3:
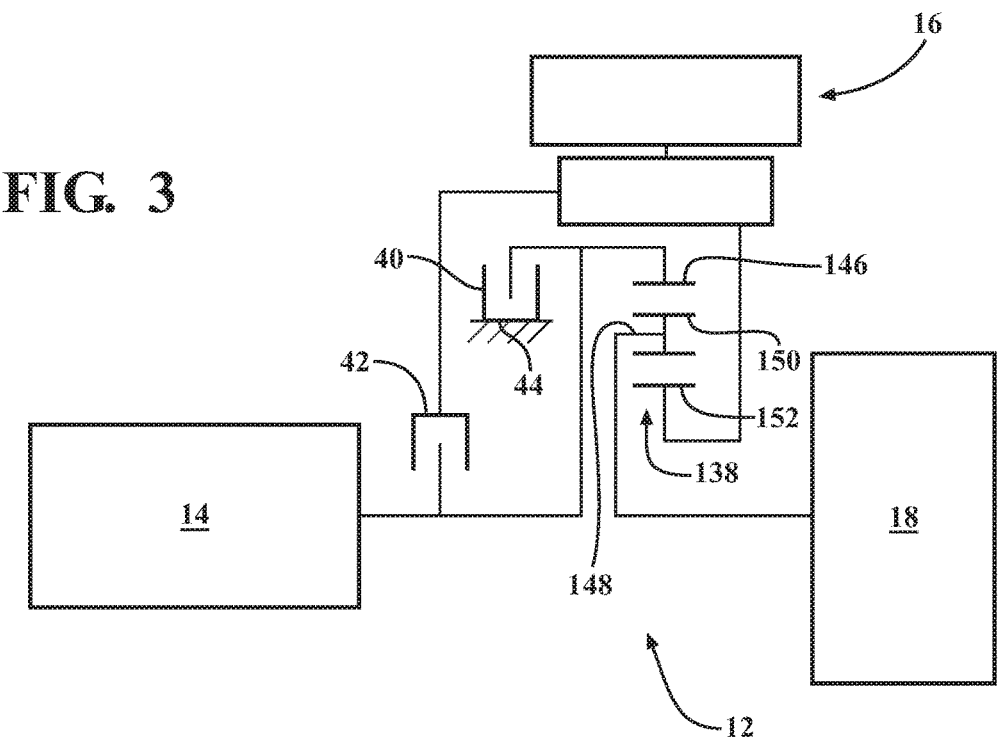
FIG. 3 is a schematic stick diagram illustration of the first drive axle corresponding to the lever diagram of FIG. 2.

In FIG. 3, the first drive axle 12 is represented by a schematic stick diagram that depicts specific planetary gear-set connections corresponding to, and reflected by the lever diagram of FIG. 2. The planetary gear-set 138 employs the ring gear member 146, which circumscribes the sun gear member 152. The carrier member 148 rotatably supports a plurality of pinion gears 150 that meshingly engage both the ring gear member 146 and the sun gear member 152. The first motor-generator 16 is continuously connected to the sun gear member 152. The engine 14 is continuously connected to the ring gear member 146. The transmission assembly 18 is continuously connected to the carrier member 148.

FIG. 4 shows another specific embodiment of the first drive axle 12 using the torque-multiplication assembly 36, herein identified with numeral 236. The assembly 236 has a specific embodiment of the planetary gear-set 38, identified with numeral 238. The transmission input member 24 is operatively connected to the first node A, which may be specifically defined as a ring gear member 246. The assembly 236 is configured such that the first power-source 14 is operatively connected to the second node B, which may be specifically defined as a carrier member 248 rotatably supporting a plurality of pinion gears 250 (shown in FIG. 5). The second power-source 16 is operatively connected to the third node C, which may be specifically defined as a sun gear member 252. In the assembly 236, the first torque-transmitting device 40 is configured to selectively connect the second node B to the housing 44, while the second torque-transmitting device 42 is configured to selectively connect the second node B to the third node C.

Figure 5:
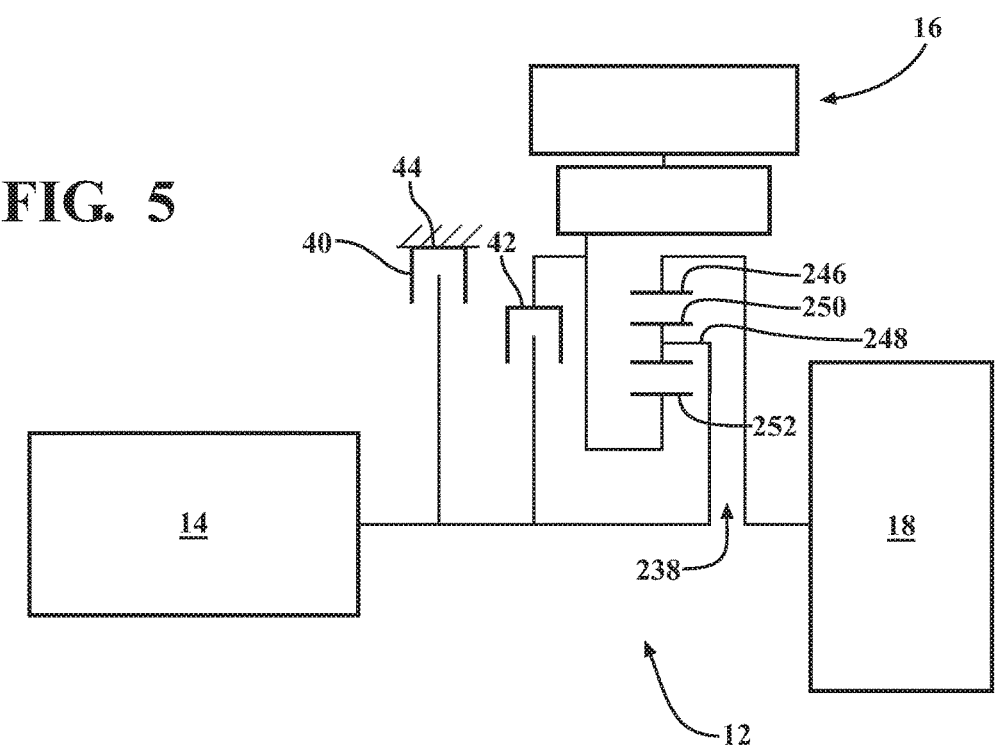
FIG. 5 is a schematic stick diagram illustration of the first drive axle corresponding to the lever diagram of FIG. 4.

In FIG. 5, the first drive axle 12 is represented by a schematic stick diagram that depicts specific planetary gear-set connections corresponding to, and reflected by the lever diagram of FIG. 3. The planetary gear-set 238 employs the ring gear member 246, which circumscribes the sun gear member 252. The carrier member 248 rotatably supports a plurality of pinion gears 250 that meshingly engage both the ring gear member 246 and the sun gear member 252. The first motor-generator 16 is continuously connected to the sun gear member 252. The engine 14 is continuously connected to the carrier member 248. The transmission assembly 18 is continuously connected to the ring gear member 246.

FIG. 6 shows a yet another specific embodiment of the first drive axle 12 using the torque-multiplication assembly 36, herein identified with numeral 336. The assembly 336 has a specific embodiment of the planetary gear-set 38, identified with numeral 338. In the hybrid-electric vehicle first drive axle 12, the second power-source 16 is operatively connected to the first node A, which may be specifically defined as a ring gear member 346. The transmission input member 24 is operatively connected to the second node B, which may be specifically defined as a carrier member 348 rotatably supporting a plurality of pinion gears 350 (shown in FIG. 7). Also, the first power-source 14 is operatively connected to the third node C, which may be specifically defined as a sun gear member 352. In the assembly 336, the first torque-transmitting device 40 is configured to selectively connect the third node C to the housing 44, while the second torque-transmitting device 42 is configured to selectively connect the first node A to the third node C.

Figure 7:
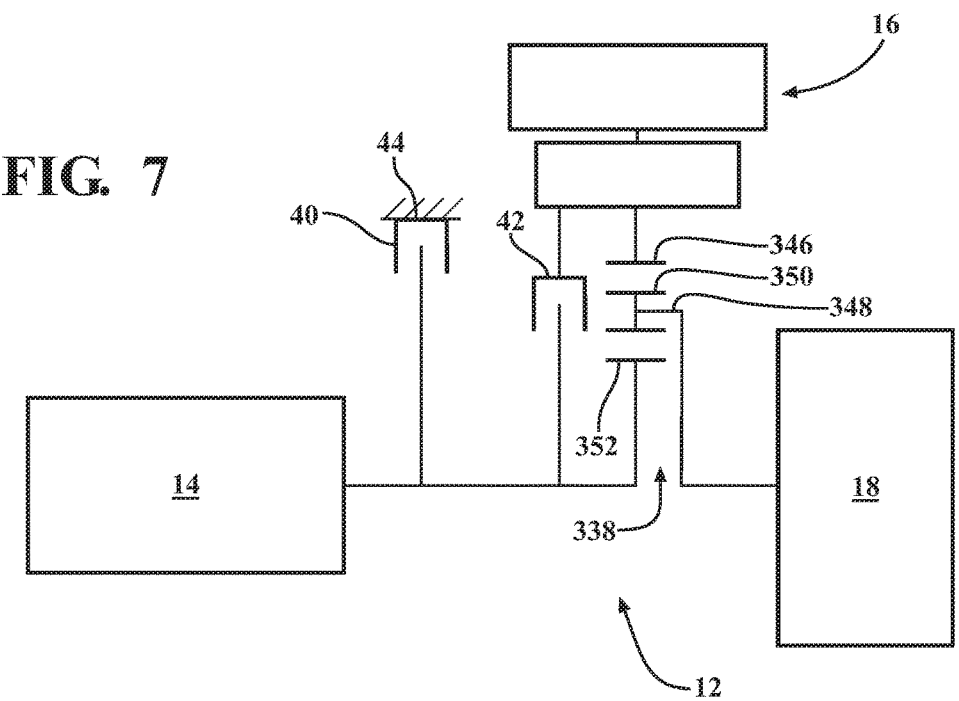
FIG. 7 is a schematic stick diagram illustration of the first drive axle corresponding to the lever diagram of FIG. 6.

In FIG. 7, the first drive axle 12 is represented by a schematic stick diagram that depicts specific planetary gear-set connections corresponding to, and reflected by the lever diagram of FIG. 4. The planetary gear-set 338 employs the ring gear member 346, which circumscribes the sun gear member 352. The carrier member 348 rotatably supports a plurality of pinion gears 350 that meshingly engage both the ring gear member 346 and the sun gear member 352. The first motor-generator 16 is continuously connected to the ring gear member 346. The engine 14 is continuously connected to the sun gear member 352. The transmission assembly 18 is continuously connected to the carrier member 348.

In each of the embodiments of the first drive axle 12 and the corresponding torque-multiplication assemblies 136, 236, and 336 described above, the first torque-transmitting device 40 may be generally configured as a brake intended to permit electric propulsion for the vehicle 10. In other words, in an engaged state, the first torque-transmitting device 40 may be configured to transmit the second torque output T2 of the second power-source 16 to the transmission assembly 18 in an electrically variable mode. Also, in each of the torque-multiplication assemblies 136, 236, and 336, the second torque-transmitting device 42 may be generally configured to couple rotating elements to enable a fixed gear ratio operation in the transmission assembly 18. Specifically, in an engaged state, the second torque-transmitting device 42 may be configured to transmit the combined first torque output T1 and the second torque output T2 to the transmission assembly 18 for hybrid propulsion of the vehicle 10. When both first and second torque-transmitting devices 40, 42 are open, the system operates in an electrically variable mode.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A power-split hybrid powertrain for a motor vehicle, comprising:
   a first power-source configured to generate a first torque output;
   a second power-source configured to generate a second torque output;
   a transmission assembly having a transmission input member continuously connected to the transmission assembly;
   a planetary gear-set having a first node, a second node, and a third node, wherein each one of two of the first, second, and third nodes is directly connected to a separate one of the first power-source and the second power-source, and a remaining node of the first, second, and third nodes is an output of the planetary gear-set and is directly connected to the transmission input member;
   a housing configured to retain the planetary gear-set;
   a first torque-transmitting device configured to selectively connect to the housing the planetary gear-set node that is directly connected to the first power-source; and
   a second torque-transmitting device configured to selectively connect the planetary gear-set node that is directly connected to the first power-source to the planetary gear-set node that is directly connected to the second power-source.

2. The power-split hybrid powertrain according to claim 1, wherein:
   the first power-source is directly connected to the first node;
   the second power-source is directly connected to the third node;
   the transmission input member is operatively connected to the second node;
   the first torque-transmitting device is configured to selectively connect the first node to the housing; and the second torque-transmitting device is configured to selectively connect the first node to the third node.

3. The power-split hybrid powertrain according to claim 1, wherein:
the first power-source is directly connected to the second node;
the second power-source is directly connected to the third node;
the transmission input member is directly connected to the first node;
the first torque-transmitting device is configured to selectively connect the second node to the housing; and
the second torque-transmitting device is configured to selectively connect the second node to the third node.

4. The power-split hybrid powertrain according to claim 1, wherein:
the first power-source is directly connected to the third node;
the second power-source is directly connected to the first node;
the transmission input member is directly connected to the second node;
the first torque-transmitting device is configured to selectively connect the third node to the housing; and
the second torque-transmitting device is configured to selectively connect the first node to the third node.

5. The power-split hybrid powertrain according to claim 1, wherein the second torque output to the transmission assembly is transmitted when the first torque-transmitting device is in an engaged state.

6. The power-split hybrid powertrain according to claim 1, wherein the first torque output and the second torque output to the transmission assembly are transmitted when the second torque-transmitting device is in an engaged state.

7. The power-split hybrid powertrain according to claim 1, wherein the first node is a ring gear member of the planetary gear-set, the second node is a carrier member of the planetary gear-set, and the third node is a sun gear member of the planetary gear-set.

8. The power-split hybrid powertrain according to claim 1, wherein the first power-source is an internal combustion engine and the second power-source is a motor-generator.

9. The power-split hybrid powertrain according to claim 1, wherein the transmission assembly is configured as a multi-speed automatic gearbox.

10. The power-split hybrid powertrain according to claim 1, wherein the transmission assembly is configured as a continuously variable transmission (CVT).

11. A hybrid-electric vehicle drive axle comprising:
a first road wheel and a second road wheel;
a first axle-shaft operatively connected to the first road wheel and a second axle-shaft operatively connected to the second road wheel; and
a power-split hybrid powertrain including:
a first power-source configured to generate a first torque output;
a second power-source configured to generate a second torque output;
a transmission assembly operatively connected to each of the first axle-shaft and the second axle-shaft and having a transmission input member continuously connected to the transmission assembly;
a planetary gear-set having a first node, a second node, and a third node, wherein each one of two of the first, second, and third nodes is directly connected to a separate one of the first power-source and the second power-source, and a remaining node of the first, second, and third nodes is an output of the planetary gear-set and is directly connected to the transmission input member;
a housing configured to retain the planetary gear-set;
a first torque-transmitting device configured to selectively connect to the housing the planetary gear-set node that is directly connected to the first power-source; and
a second torque-transmitting device configured to selectively connect the planetary gear-set node that is directly connected to the first power-source to the planetary gear-set node that is directly connected to the second power-source.

12. The hybrid-electric vehicle drive axle according to claim 11, wherein:
the first power-source is directly connected to the first node;
the second power-source is directly connected to the third node;
the transmission input member is operatively connected to the second node;
the first torque-transmitting device is configured to selectively connect the first node to the housing; and
the second torque-transmitting device is configured to selectively connect the first node to the third node.

13. The hybrid-electric vehicle drive axle according to claim 11, wherein:
the first power-source is directly connected to the second node;
the second power-source is directly connected to the third node;
the transmission input member is directly connected to the first node;
the first torque-transmitting device is configured to selectively connect the second node to the housing; and
the second torque-transmitting device is configured to selectively connect the second node to the third node.

14. The hybrid-electric vehicle drive axle according to claim 11, wherein:
the first power-source is directly connected to the third node;
the second power-source is directly connected to the first node;
the transmission input member is directly connected to the second node;
the first torque-transmitting device is configured to selectively connect the third node to the housing; and
the second torque-transmitting device is configured to selectively connect the first node to the third node.

15. The hybrid-electric vehicle drive axle according to claim 11, wherein the second torque output to the transmission assembly is transmitted when the first torque-transmitting device is in an engaged state.

16. The hybrid-electric vehicle drive axle according to claim 11, wherein the first torque output and the second torque output to the transmission assembly are transmitted when the second torque-transmitting device is in an engaged state.

17. The hybrid-electric vehicle drive axle according to claim 11, wherein the first node is a ring gear member of the planetary gear-set, the second node is a carrier member of the planetary gear-set, and the third node is a sun gear member of the planetary gear-set.

18. The hybrid-electric vehicle drive axle according to claim 11, wherein the first power-source is an internal combustion engine and the second power-source is a motor-generator.

19. The hybrid-electric vehicle drive axle according to claim 11, wherein the transmission assembly is configured as a multi-speed automatic gearbox.

20. The hybrid-electric vehicle drive axle according to claim 11, wherein the transmission assembly is configured as a continuously variable transmission (CVT).

* * * * *